United States Patent [19]

Swailes

[11] 4,338,726

[45] Jul. 13, 1982

[54] LINE BORE GAUGE

[76] Inventor: Charles W. Swailes, 18125 Renwick Rd., Azusa, Calif. 91702

[21] Appl. No.: 168,010

[22] Filed: Jul. 14, 1980

[51] Int. Cl.³ .............................................. G01B 5/08
[52] U.S. Cl. .............................. 33/178 R; 33/174 Q; 33/172 B; 33/172 D
[58] Field of Search ............ 33/178 R, 174 Q, 174 P, 33/172 R, 172 B, 172 D, 412

[56] References Cited

U.S. PATENT DOCUMENTS

| | | | |
|---|---|---|---|
| 1,424,310 | 8/1922 | Krebs | 33/172 D |
| 2,571,853 | 10/1951 | Fontecchio | 33/172 B |
| 3,167,866 | 2/1965 | Steineman | 33/172 D |
| 3,534,480 | 10/1970 | Jordan et al. | 33/174 Q |

*Primary Examiner*—Willis Little
*Attorney, Agent, or Firm*—Christie, Parker & Hale

[57] ABSTRACT

Apparatus for gauging the alignment of a multiplicity of bearing seats lying along a common reference axis comprising an elongated shaft, first and second bearings for rotatably journaling the shaft in a pair of reference bearing seats, a radial distance indicator mechanism coupled to a collar slidably mounted on the shaft, and a means to contact the radial distance indicator mechanism to selected bearing seats. When the shaft is rotated with the radial distance indicator mechanism in contact with the bearing seat, eccentricity of a selected bearing seat can be determined with respect to the reference axis.

18 Claims, 3 Drawing Figures

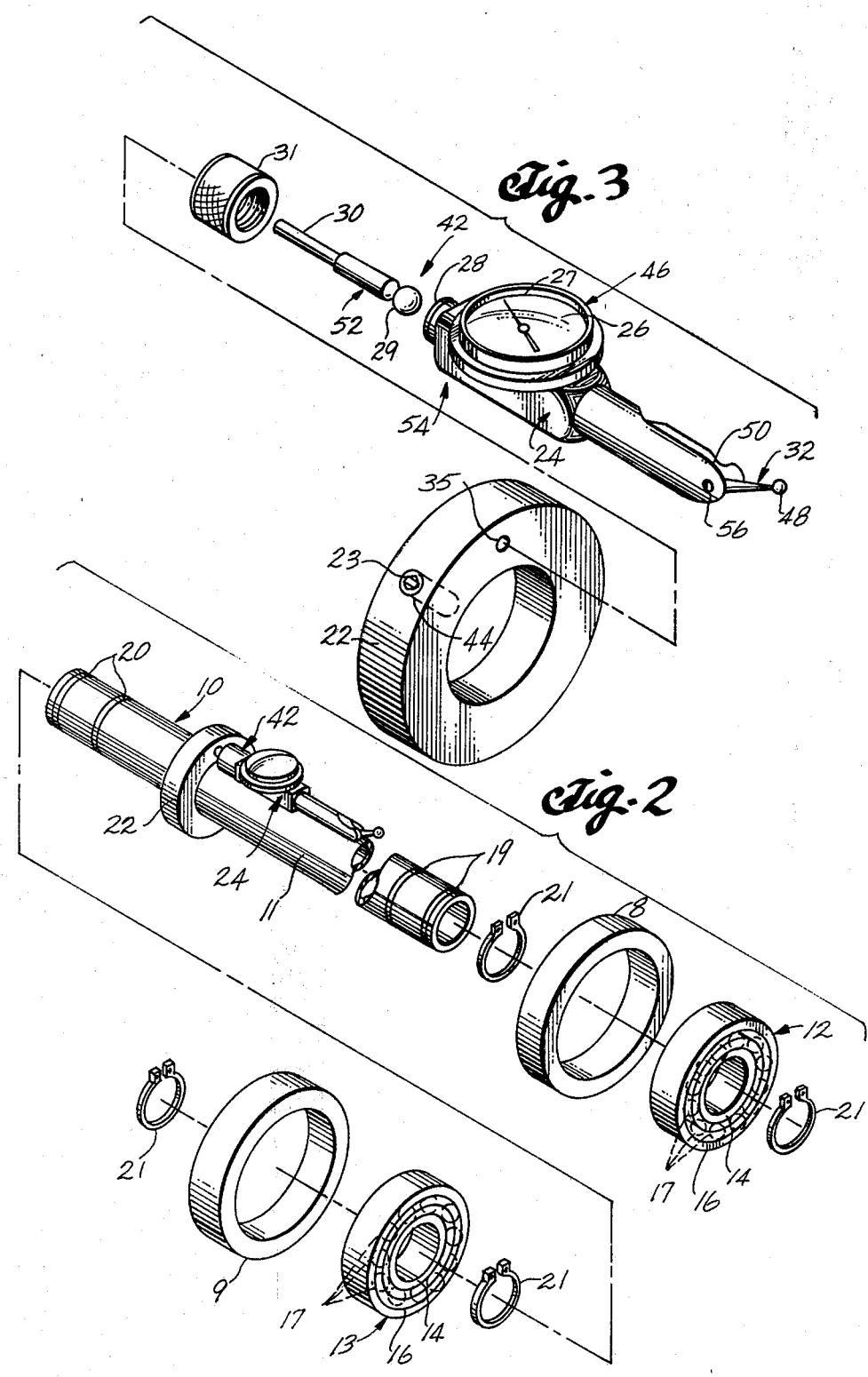

LINE BORE GAUGE

BACKGROUND OF THE INVENTION

This invention relates to the field of automotive engine rebuilding, and more specifically, to a gauge for measuring the degree of roundness of individual circular bearing seats, as well as the deviation of the center of curvature of a bearing seat with respect to a defined reference axis within an engine.

Equipment with camshafts, crankshafts, power shafts or other components with multiple journal bearings present a significant problem to the manufacturer or rebuilder of such equipment. The bearing seats frequently become misaligned from uneven wear, and occasionally are misaligned immediately after the initial boring. This problem gives rise to the need for a quick, accurate method of measuring the alignment of multiple circular bearing seats, as well as the degree of roundness of individual bearing seats, both during equipment rebuilding and immediately after initial manufacture.

In the automotive engine rebuilding industry, it is common to rebore the bearing seats of the crankshaft as a matter of course, because of the difficulty and expense in determining alignment. One method of measuring bearing seat alignment uses existing machinist's measuring tools and requires a complex setup and several hours of a skilled machinist's time. This method does not prove to be cost-effective for a small engine rebuilding operation.

An alternate method of gauging bearing seat alignment and roundness employs a precision-ground shaft which runs through the length of the engine block. The engine block has two main crankshaft bearing seats, into which the shaft is bolted by means of two main bearing caps. Machinist's layout blue is applied to the bearing seats. As the shaft rotates in the main seats, the presence of machinist's blue on the shaft indicates misalignment of bearing seats intermediate to the two main seats. Like the method noted above, this technique is very timeconsuming. Furthermore, it does not give a quantitative measurement of misalignment.

SUMMARY OF THE INVENTION

This invention provides a line bore gauge for measuring, in an engine or the like having a series of at least three arcuate bearing seats with substantially common centers of curvature, a selected property of a selected bearing seat of the series at differing angular positions about a reference axis defined by the centers of curvature of a given pair of the remaining bearing seats of the series chosen for purposes of defining the reference axis for seats of interest. The line bore gauge comprises an elongate shaft and a pair of toroid-shaped adaptors on the shaft. The adaptors have outer diameters corresponding to the chosen bearing seats for alignment of the shaft when in use with the centers of curvature of such respective chosen seats.

The line bore gauge additionally comprises an axially positionable collar disposed upon the shaft between the adaptors, a radial distance indicator mechanism, and means for coupling the radial distance indicator mechanism between the collar and the surface of the selected bearing seat. Such coupling provides measurement of the bearing surface relative to the reference axis.

The line bore gauge further comprises means for changing the angular position of the radial distance indicator mechanism about the reference axis to vary the angular relation of the mechanism to the adjacent bearing surface to obtain measurements of different locations on the bearing surface.

It is a primary objective of the present invention to provide a quick, accurate method of ascertaining bearing seat alignment and roundness with respect to a given reference axis.

In order to satisfy this objective, a line bore gauge is disclosed which comprises a long shaft of uniform cross-section. Any two bearing seats in an engine block are used as reference seats, the centers of curvature of the reference seats being used to define a reference axis running through the length of the block. The shaft is supported within the two reference seats by means of two bearing sets encircling the shaft. The bearing sets are disposed within, and are concentric with, the reference bearing seats, causing the central axis of the shaft to be coaxial with the reference axis. The bearing sets allow the shaft to rotate freely within the reference seats. In an alternate embodiment, adaptor rings of different inside and outside diameters are disposed around the bearing sets to allow the device to be used with reference seats of greater inside diameters.

Variations in the distance from any point on the interior surface of a bearing seat to the geometric foot of that point in the reference axis, are determined with a radial distance indicator mechanism which is coupled to the shaft by means of a sliding collar. The collar encircles the shaft and allows the radial distance indicator mechanism to be moved anywhere along the length of the shaft and fixed thereto by means of a set screw in the collar. The indicator mechanism is coupled to the collar by means of a pin attached to the collar, and a lockable socket joint disposed between the pin and the indicator.

The radial distance indicator mechanism comprises a probe and a visual readout means. The probe extends out from the visual readout means at an angle from the reference axis. The probe is hingedly coupled to the indicator and is spring-biased away from alignment with the reference axis. Movements of the end of the probe with respect to the reference axis are measured by the visual readout means, which comprises a needle and dial gauge.

In practice, the collar is slid along the shaft until the probe end is adjacent a selected bearing seat. The ball-and-socket joint is loosened and the probe is contacted to the bearing seat. The collar and ball-and-socket joint are locked into position and the shaft is rotated, thereby rotating the probe along the interior surface of the seat. Variations in the roundness or alignment of the seat cause the probe to move radially in and out. The variation is indicated on the visual readout means in units convenient to machinists.

This device is capable of quickly, accurately, and efficiently determining bearing seat alignment and roundness, with respect to the reference axis. The bearing seats may be moved along the shaft to adapt the device to applications where the reference seats are separated by different distances. If desired, the device can be used to ascertain the roundness and alignment of seats with respect to a reference axis defined by two bearing seats intermediate to the two main seats. This allows the roundness and alignment of the main seats to be verified as well.

Another advantage lies in the fact that the gauge can be used successfully by an ordinary auto mechanic without the skill of the machinist. Because of the ease with which the device operates, it can improve the efficiency of both large and small engine rebuilding operations.

BRIEF DESCRIPTION OF THE DRAWINGS

The features of a specific embodiment of the invention are illustrated in the drawings where:

FIG. 2 is a perspective view of the line bore gauge having an exploded view of one end; and FIG. 3 is an exploded detail of the dial indication and collar.

DETAILED DESCRIPTION

Figure 1:
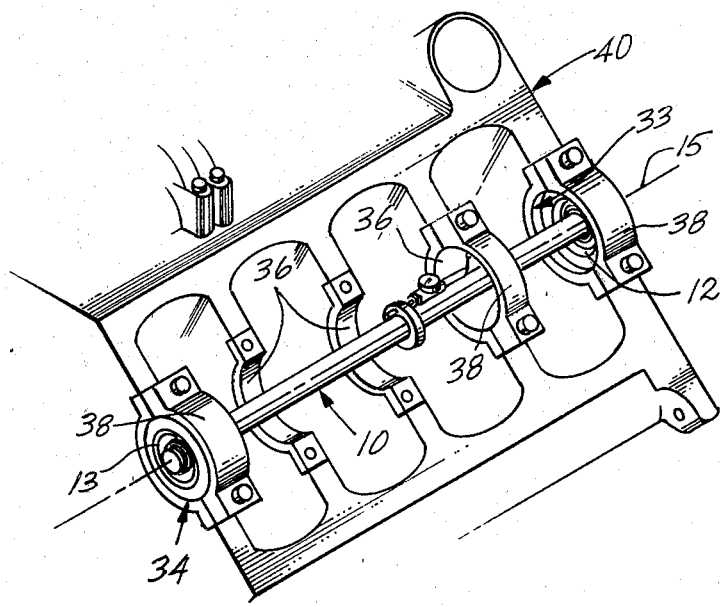
FIG. 1 is a perspective view of a line bore gauge incorporating the principles of the invention, shown journaled in the end bearing seats of an ordinary automobile engine block.

A line bore gauge 10 suitable for measuring the alignment and roundness of circular bearing seats in an automobile engine block or the like is shown in FIGS. 1, 2 and 3. FIG. 1 depicts the gauge in situ, in an engine block 40. The block 40 has a plurality of engine bearing seats 36, 33, and 34 for holding a crankshaft within the engine. In most engines, the crankshaft is held in place by means of bearing seat caps 38, which form half of the bearing seat, as shown in FIG. 1, the other half of the bearing seat being integral with the block 40. In other applications, the bearing seats may be completely closed, the shaft being installed by sliding in from one end. The bearing seats on each end of the block are referred to as main bearing seats 33 and 34, while those bearing seats intermediate to the main bearing seats are referred to as intermediate bearing seats 36.

Because of the strong, intermittent, lateral forces which act on the crankshaft during engine operation, the bearing seats tend to wear unevenly. The device to be described hereinafter provides a means to measure the amount of wear to individual bearing seats when rebuilding an engine. The device also allows a new engine block to be measured, to determine the alignment of the bearing seats, as well as the degree of roundness of each seat.

In measuring the degree of roundness of the individual seats and the alignment of seats with respect to one another, a central reference axis 15 is defined along the length of the block through all of the bearing seats. It is with reference to this axis 15 that the misalignment of individual seats, one from another, is determined. In the preferred practice, the reference axis 15 is defined by the centers of curvature of the two main bearing seats 33 and 34. Alternately, the reference axis is defined by any two bearing seats in the block 40, thereby allowing eccentricities in the main bearing seats 33 and 34 to be measured with respect to the intermediate bearing seats 36.

The line bore gauge is depicted in detail in FIGS. 2 and 3 showing an elongated shaft 11 having a uniform circular cross section along its length. The shaft length may be variable, but is selected for the requirements of the anticipated application. The shaft 11 is constructed from ferrous or nonferrous metal, plastic or other rigid material. It may be solid or hollow so long as it possesses sufficient rigidity to prevent flexing when used in the prescribed manner.

The shaft 11 extends through all of the bearing seats 33, 34 and 36, and is supported therein by means of two circular bearing sets 12 and 13, encircling the shaft 11 and being disposed concentrically within the two reference bearing seats 33 and 34 respectively. The bearing sets 12 and 13, each have an inner race 14 and an outer race 16, the two races being separated by a number of ball 17 or roller bearings. The placement of the bearing sets 12 and 13 allows the shaft 11 to rotate within the reference bearing seats 33 and 34 and additionally causes the central longitudinal axis of the shaft 11 to coincide with the reference axis 15.

In the preferred embodiment, the shaft 11 has a first and second pair of circumferential grooves, 19 and 20 respectively, disposed at or near the ends of the shaft 11. Each pair of grooves is spaced apart by a distance slightly greater than the width of the inner race 14 of the first and second bearing sets 12 and 13. Circular clips 21 are seated in the grooves on each side of each bearing set to limit the axial movement of the bearing set with respect to the shaft 11. When the bearing sets are locked in place by the circular clips 21, the first and second groove pairs 19 and 20 separate the first and second bearing sets 12 and 13 on the shaft, by a distance approximately equivalent to the distance between the first and second reference bearing seats 33 and 34. It can be seen that a plurality of pairs of grooves may be disposed along the shaft to provide a plurality of spacings between the bearing sets. This allows the bearing sets 12 and 13 to be affixed to the shaft at different positions for disposition in engines with different reference bearing spacings.

The inside diameters of circular bearing seats may vary from one engine to another, so a pair of adaptor rings 8 and 9 is provided. The adaptor rings 8 and 9 have inside and outside diameters chosen so that the bearing sets 12 and 13 nestle within the adaptor rings 8 and 9 respectively; and the adaptor rings 8 and 9 fit snugly within the reference bearing seats 33 and 34.

As noted above, crankshafts in automobile engines have half of the circular crankshaft bearing seats 33, 34, and 36 integral with the engine block 40, while the other half of the seat is defined by the removable bearing caps 38. In the preferred practice, the end bearing seats 33 and 34 are selected as the reference seats, as shown in FIG. 1; so the first and second bearing set assemblies 12 and 13, including the adaptor rings 8 and 9, are locked into the bearing seats with the removable bearing caps 38. In applications where the bearing seats are a single piece, as in an automotive camshaft bearing seats, the outside diameter of the adaptor rings is selected to permit the adaptor ring and bearing assembly to be slidably positioned within a camshaft bearing seat.

A collar 22, comprising an annular ring is concentrically disposed about the shaft 11. The collar 22 has an inside diameter slightly greater than the outside diameter of the shaft 11, allowing it to be slidably located along the shaft 11. In alternative embodiments, the shaft may have a noncircular cross section, i.e. square or rectangular. In these embodiments the collar defines an opening having a cross-section similar to that of the shaft, but slightly larger, to permit the collar to be slidably positioned along the shaft.

A threaded hole 44 extends from the interior of the collar 22, radially outward to the periphery of the collar 22. A set screw 23 is disposed therein and permits the collar 22 to be selectively locked to the shaft 11.

A second hole 35 extends axially through the collar 22 between its minor and major radii, the hole 35 being aligned with the reference axis 15. A pin 30 is press-fit into the hole 35 and extends outwardly, parallel to the reference axis 15. A ball-and-socket joint 42 connects the pin 30 to a radial distance indicator mechanism 24, a ball 29 being located on the distal end 52 of the pin 30. A socket 28 is connected to the proximal end 54 of the radial distance indicator mechanism 24. A sleeve 31 threaded over the outside of the socket 28, locks the ball 29 within the socket 28, enabling the radial distance indicator mechanism 24 to be maintained in fixed orientation with respect to the reference axis 15. The sleeve 31 may be loosened to permit the universal movement of the indicator 24 by rotation of the ball 29 within the socket 28.

The radial distance indicator mechanism 24 is comprised of a radially displaceable probe 32 and a visual readout means 46. A hinge 56, pivotally affixes the probe 32, to the greater portion of the radial distance indicator mechanism 24. Pivoting the probe 32 on the hinge 56 varies the angle between the axis of the probe 32 and the reference axis 15. This probe movement causes variation in the distance from the point defined by the distal end 48 of the probe 32 to the geometric foot of that point in the reference axis 15. An additional coupling (not shown) connects the proximal end 50 of the probe 32 to the internal mechanism of the visual readout means 46, such that the variation in the distance from the probe 32 to the reference axis 15 is measured in units of distance on the visual readout means 46.

A spring (not shown) additionally couples the proximal end 50 of the probe 32, to the internal mechanism of the visual readout means, biasing the probe 32 out of alignment with the reference axis 15 so that the distal end of the probe 32 will readily contact the inside surface of selected bearing seats 36. In the preferred embodiment, the visual readout means 46 is a simple dial 26 and needle 27 gauge calibrated in units convenient to machinists.

In practice, the device is installed in the main bearing seats of an engine block 40 with the slidable collar 22 being disposed between the two bearing means 12 and 13. The collar 22 is slid along the shaft 11 until the distal end 48 of the probe 32 is adjacent a selected bearing seat 36. The set screw 23 is tightened, locking the collar 22 to the shaft 11. The distal end 48 of the probe 32 is contacted to the interior surface of the selected bearing seat 36 and the threaded sleeve 31 is tightened to maintain the orientation of the radial distance indicator mechanism 24 with respect to the reference axis 15. The shaft 11 is rotated, thereby moving the distal end 48 of the probe 32 around the interior surface of the selected bearing seat 36. Variations in the distance from a point in the interior surface of the selected bearing seat 36 to the geometric foot of that point in the reference axis 15 cause the distal end 48 of the probe 32 to move radially in and out. This movement is displayed on the dial 26 and needle 27 gauge as the device is rotated.

If it is desired to verify the roundness or alignment of the two main bearing seats 33 and 34, two of the intermediate seats 36 may be chosen as reference seats and the collar 22 is placed on the shaft 11 outside of the two bearing means 12 and 13. Otherwise, operation of the device is identical.

The present invention is particularly attractive since it is portable, quick, and accurate, and can be adapted to any internal combustion engine or other type of engine in which the inspection of machined surfaces to a common reference axis is critical. The device is simple to operate, and so may be used by an unskilled mechanic in either small- or large-scale engine building operations.

The described embodiments of the invention are only considered to be preferred and illustrative of the invention concepts; the scope of the invention is not to be restricted to such embodiments. Various and numerous other arrangements may be devised by one skilled in the art without departing from the spirit and scope of this invention. For example, it is contemplated that the adaptor rings may be interchangeably substituted for rings having various diameters and widths to accommodate a variety of applications. Furthermore, it is possible that bearing sets may be selected having outer races which have outside diameters approximately equal to the reference bearing seats, thus precluding the necessity for adaptor rings in these applications.

What is claimed is:

1. A line bore gauge for measuring, in an engine or the like having a series of at least three arcuate bearing seats with substantially common centers of curvature, a selected property of a selected bearing seat of the series at differing angular positions about a reference axis defined by the centers of curvature of a given pair of the remaining bearing seats of the series chosen for purposes of defining the reference axis for seats of interest, the line bore gauge comprising:

an elongate shaft;
a pair of toroid-shaped adaptors on the shaft, the adaptors having outer diameters corresponding to the chosen bearing seats for alignment of the shaft when in use with the centers of curvature of such respective chosen seats;
an axially positionable collar disposed upon the shaft between the adaptors;
a radial distance indicator mechanism;
means for coupling the radial distance indicator mechanism between the collar and the surface of the selected bearing seat, thereby to provide measurement of such bearing surface relative to the reference axis; and
means for changing the angular position of the radial distance indicator mechanism about the reference axis thereby to vary the angular relation of the mechanism to the adjacent bearing surface to obtain measurements at different locations on the bearing surface.

2. The apparatus of claim 1 wherein the shaft has a uniform cross-section along its length.

3. The apparatus of claim 2 wherein the shaft cross-section is circular.

4. The apparatus of claim 1 wherein the means for changing the angular position of the radial distance indicator mechanism about the reference axis comprises:

first and second bearing means disposed along the shaft, concentrically within each of the adaptors respectively.

5. The apparatus of claim 4 wherein the first and second bearing means each comprises:
an inner race;
an outer race concentric with the inner race; and
a plurality of ball roller bearings separating the inner and outer races.

6. The apparatus of claim 4 further comprising:
at least two pair of grooves disposed on the shaft, one groove of each pair being disposed on each side of the first and second bearing means; and
a circular clip removeably seated in each groove to prevent axial movement of the adaptor with respect to the shaft.

7. The apparatus of claim 6 wherein the grooves are circumferentially disposed around the shaft.

8. The apparatus of claim 1 wherein the slidable collar further comprises:
means to selectively lock the collar to the shaft.

9. The apparatus of claim 8 wherein the locking means comprises:
a threaded hole extending radially from the center of the collar to its periphery; and
a set screw disposed in the threaded hole to lock the collar to the shaft.

10. The apparatus of claim 1 wherein the means for coupling the radial distance indicator mechanism between the collar and the surface of the selected bearing seat comprises:
a hole extending axially through the collar and aligned with the longitudinal axis of the shaft;
a pin disposed within the hole and extending outwardly, parallel to the axis of the elongated shaft;
a ball disposed at the distal end of the pin;
a socket disposed at the proximal end of the radial distance indicator mechanism;
the ball being disposed within the socket; and
means for selectively clamping the ball within the socket to position the radial distance indicator mechanism relative to the reference axis.

11. The apparatus of claim 1 wherein the radial distance indicator mechanism comprises:
a radially displaceable probe;
a visual readout means to measure variations in the radial displacement of the probe; and
means for coupling the visual readout means to the probe.

12. The apparatus of claim 11 wherein the means for coupling the visual readout means to the probe comprises:
a hinge pivotally affixing the probe to the visual readout means, such that pivoting of the probe on the hinge varies the distance from a point defined by the distal end of the probe, to the geometric foot of the point in the reference axis; and
means coupling the proximal end of the probe to the visual readout means, such that variations in the distance from the point defined by the distal end of the probe to the geometric foot of that point in the reference axis are registered in calibrated units on the visual readout means.

13. The apparatus of claim 12 wherein a spring additionally couples the proximal end of the probe to the visual readout means, biasing the probe away from alignment with the reference axis, into contact with selected bearing seats.

14. The apparatus of claim 11 wherein the visual readout means comprises:
a needle and dial gauge calibrated in units of distance.

15. A line bore gauge to measure variations in the radius of a selected bearing seat with respect to a defined reference axis comprising:
first and second reference bearing seats, defining the reference axis by their centers of curvature;
an elongated shaft of circular cross-section disposed concentrically within said reference bearing seats;
a positionable collar disposed on the shaft;
first and second bearing means disposed along the shaft, concentrically within the first and second reference bearing seats respectively;
at least two pair of grooves disposed on the shaft, one groove being disposed on each side of the first and second bearing means;
a circular clip removably seated in each groove to prevent axial movement of the bearing means with respect to the shaft;
a threaded hole extending radially from the center of the collar to its periphery;
a set screw disposed in the threaded hole to lock the collar to the shaft;
a hole extending axially through the collar between its minor and major radii, and aligned with the longitudinal axis of the shaft;
a pin disposed within the hole and extending outwardly, parallel to the axis of the elongated shaft;
a ball disposed at the distal end of the pin;
a radially displaceable probe;
a visual readout means to measure variations in the radial displacement of the probe;
a hinge pivotally affixing the probe to the visual readout means, such that pivoting of the probe on the hinge varies the distance from a point defined by the distal end of the probe to the geometric foot of the point in the reference axis;
means coupling the proximal end of the probe to the visual readout means, such that variations in the distance from the point defined by the distal end of the probe to the geometric foot of that point in the reference axis are registered in calibrated units on the visual readout means;
a socket disposed at the proximal end of the visual readout means;
the ball being disposed within the socket;
a threaded sleeve which may be selectively tightened onto the socket to maintain the ball in fixed orientation in the socket; and
a spring additionally coupling the proximal end of the probe to the visual readout means biasing the probe away from alignment with the reference axis, into contact with selected bearing seats.

16. A line bore gauge for measuring in an engine or the like having a series of at least three arcuate bearing seats with substantially common centers of curvature, a selected property of a selected bearing seat of the series at differing angular positions about a reference axis defined by the centers of curvature of a given pair of the remaining bearing seats of the series chosen for purposes of defining the reference axis for seats of interest, the line bore gauge comprising:
an elongate shaft;
a pair of axially positionable toroid-shaped adaptors on the shaft, the adaptors having outer surfaces corresponding to the chosen bearing seats for alignment of the shaft when in use with the centers of curvature of such respective chosen seats, the adaptors when in use being positioned relative to each other to correspond to the axial separation of the chosen referencing bearing seats;
a collar disposed upon the shaft which is axially positionable relative to the adaptors;
a radial distance indicator mechanism;
coupling means for coupling the radial distance indicator mechanism between the collar and the surface of the selected bearing seat, thereby to provide measurement of such bearing surface relative to the reference axis; and
positional means for changing the angular position of the radial distance indicator mechanism about the reference axis thereby to vary the angular relation of the mechanism to the adjacent bearing surface to obtain measurements at different locations on the bearing surface.

17. A line bore gauge to measure variations in the radius of a selected bearing seat with respect to a reference axis defined by the centers of curvature of a pair of different reference bearing seats, the line bore gauge comprising:

an elongated shaft for concentric disposition within said reference seats;

a positionable collar disposed upon the shaft;

a radial distance indicator mechanism;

means for coupling the radial distance indicator mechanism to the collar and for contacting the radial distance indicator mechanism to the selected bearing seat comprising:

a hole extending axially through the collar and aligned with the longitudinal axis of the shaft;

a pin disposed within the hole and extending outwardly, parallel to the axis of the elongated shaft;

a ball disposed at the distal end of the pin;

a socket disposed at the proximal end of the radial distance indicator mechanism, the ball being disposed within the socket; and means for selectively clamping the ball within the socket to position the radial distance indicator mechanism relative to the reference axis; and means for rotating the radial distance indicator mechanism about the reference axis.

18. The apparatus of claim 17 wherein the means for selectively clamping the ball within the socket comprises:

a threaded sleeve which may be selectively tightened over the socket to lock the ball in fixed orientation within the socket.

* * * * *